United States Patent [19]
Dudek

[11] 3,907,342
[45] Sept. 23, 1975

[54] BARB MEANS FOR A HOSE CONNECTOR
[75] Inventor: Edmund C. Dudek, St. Charles, Ill.
[73] Assignee: Thor Power Tool Company, Aurora, Ill.
[22] Filed: Aug. 27, 1973
[21] Appl. No.: 391,865

[52] U.S. Cl. .................. 285/242; 285/174; 285/259
[51] Int. Cl............................................ F16L 33/22
[58] Field of Search ........... 285/259, 253, 252, 239,
285/242, 256, 255, 254, 251, 257, 258, 238,
240, 241, 243, 244, 245, 246, 247, 248, 249,
250, 149, 174

[56] References Cited
UNITED STATES PATENTS
| | | | |
|---|---|---|---|
| 683,482 | 10/1901 | Neumeyer | 285/254 |
| 1,980,466 | 11/1934 | Angeja | 285/259 X |
| 2,446,599 | 8/1948 | Knaggs | 285/259 X |
| 2,661,225 | 12/1953 | Lyon | 285/259 X |
| 2,816,781 | 12/1957 | Woodling | 285/259 X |
| 3,160,428 | 12/1964 | Goodall | 285/259 X |
| 3,174,777 | 3/1965 | Lodholm et al. | 285/259 X |
| 3,526,416 | 9/1970 | Kish | 285/253 X |
| 3,539,207 | 11/1970 | Harris | 285/259 X |
| 3,711,131 | 1/1973 | Evans | 285/259 X |

FOREIGN PATENTS OR APPLICATIONS
| | | | |
|---|---|---|---|
| 970,583 | 6/1950 | France | 285/239 |
| 1,167,133 | 4/1964 | Germany | 285/149 |

Primary Examiner—Thomas F. Callaghan
Attorney, Agent, or Firm—Hibben, Noyes & Bicknell

[57] ABSTRACT

A hose connector having a tubular body has improved barb means thereon for retaining a hose on the body of the connector. The barb means comprises a plurality of small barbs arranged in dual tapering sets. The first set of barbs increases in size from an end of the tubular body to an intermediate portion thereof at one mean slope, and the second set of barbs increases in size, moving from the intermediate portion toward the opposite end of the body, at a larger mean slope. The barbs provide a very tight interference fit with the hose, but yet permit the hose to be manually installed on the body of the connector.

3 Claims, 6 Drawing Figures

US Patent  Sept. 23,1975  3,907,342
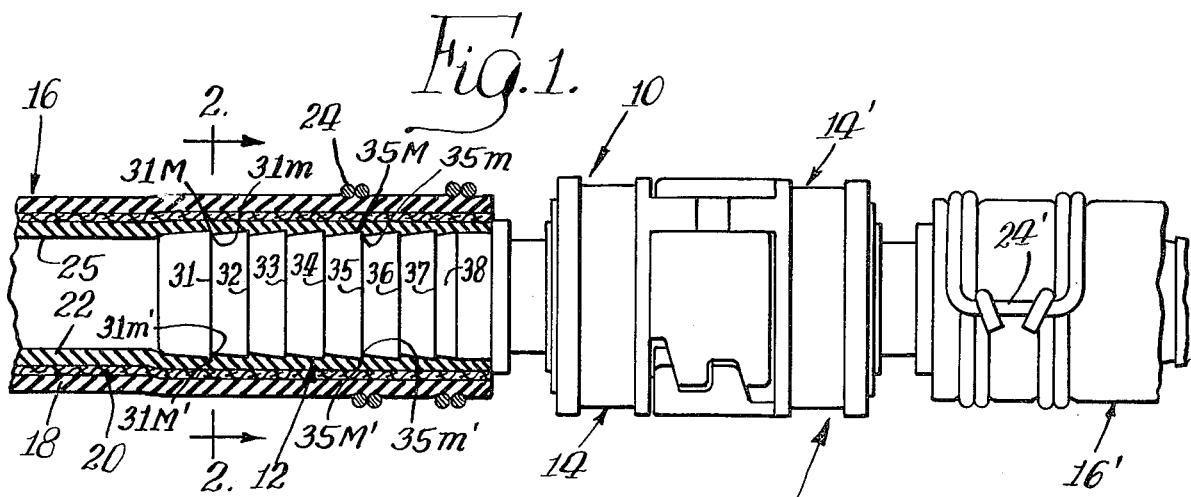
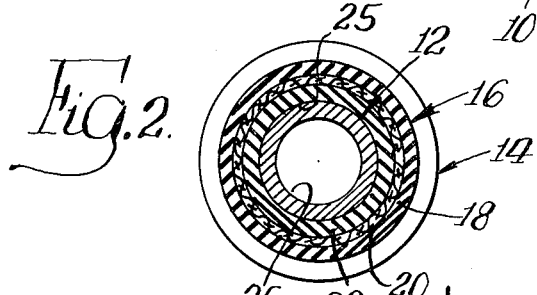
Fig.1.
Fig.2.
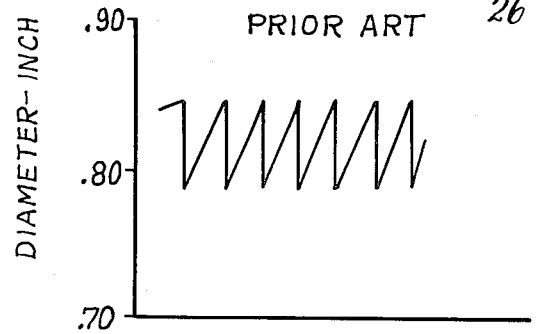
Fig.4.
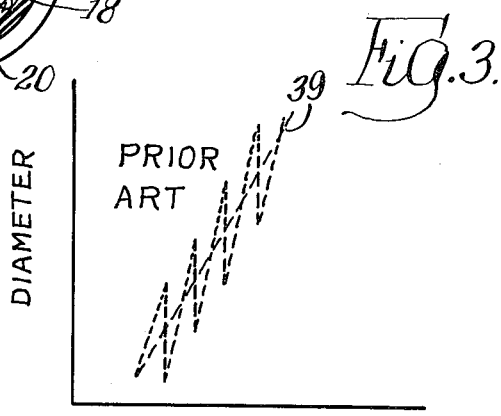
Fig.3.
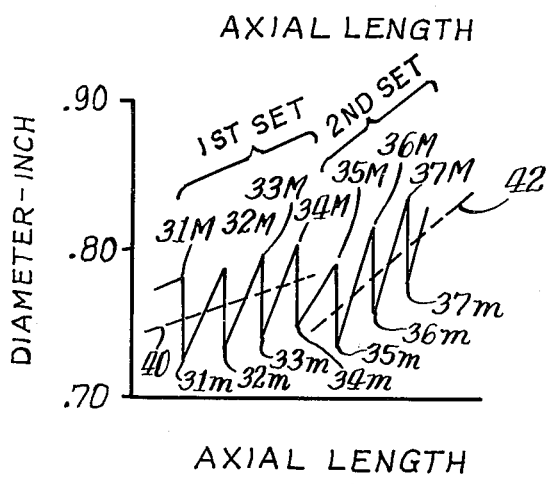
Fig.5.
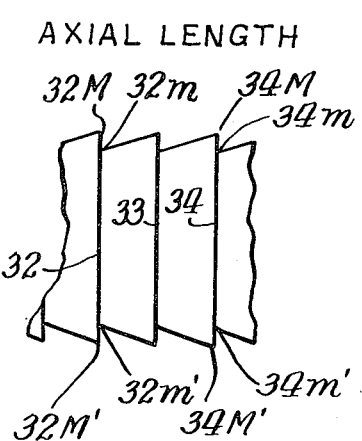
Fig.6.

BARB MEANS FOR A HOSE CONNECTOR

This invention relates to a hose connector and more particularly to improved barb means for retaining a hose on the body of the connector.

Flexible, rubbler-like hose has found wide application and acceptance in industry. Such hose usually has some form of connector at its ends. Typically, the connector has a tubular body with a coupling portion at one end and a shank or stem portion at the other end, the hose being engaged on the stem portion. The coupling portion may be of the type shown in the J. T. Nelson, U.S. Pat. No. 1,303,367, issued May 13, 1919, or of any other well-known type.

The connector stem of the prior art usually had a plurality of annular ribs or barbs, which may be similar to those shown in the Nelson patent, to increase the grip of the hose on the stem. These barbs were not the same size, but visibly increased in size. Another type of barb means of the prior art used on such a connector stem comprised a plurality of uniform size barbs which were generally larger in diameter than the inner diameter of the hose.

While the Nelson type barb means permitted the hose to be manually installed on the stem, such barbs had the disadvantage of providing a tight interference fit only at the extreme end of the hose, such connection being prone to leak. The uniform size barb means while providing a tight fit along the length of the connector stem, had the disadvantage of difficulty in manually assembling the hose on the stem, it being difficult to slide the hose over the barbs.

The disadvantages of hose connectors with prior art barb means have been overcome by a hose connector having the novel and improved barb means of the present invention. The connector comprises a tubular body having at one end a stem portion provided with the novel arrangement of barbs over which the hose is fitted. The opposite end of the tubular body, in a typical embodiment, may be constructed as a coupling for connection of another fluid conduit. However, the connector of the present invention may be used wherever it is desired to attach a hose to a fitting or other equipment, e.g., a pump, compressor, or the like.

In the present invention the barbs are arranged on the stem of the connector in dual sets. The first set of barbs tapers or increases in size from a barb at one end of the stem generally slightly larger than the nominal inside diameter of the hose to a barb of substantially greater size at an intermediate portion of the stem. The second set of barbs tapers or increases in size from a barb at the intermediate portion of a size smaller than the last barb of the first set to a barb of the greater size at the opposite end of the stem. The barb means of the present invention permits manual installation of the hose on the stem since the first or initial barb of the first set is small in size compared to the opening in the hose. Further, since the hose may be slipped onto the initial portion of the stem with a degree of speed, the momentum and inertia generated during the initial part of the installation help to slide the hose over the larger barbs of the first and second sets which provide very tight interference fits to prevent leakage.

The primary object of the barb means of the present invention is to provide novel and improved retaining of a hose to a connector.

Another object of the barb means of the present invention is to facilitate manual assembly of the hose onto the connector, but yet provide a good interference fit for the hose.

These and other objects of the present invention will become apparent from the following description taken in conjunction with the accompanying figures of the drawings wherein:

FIG. 1 is an elevational view of a hose coupling having at one end a coupling portion and at the other end a stem with barb means of the present invention, a hose shown in cross section being mounted on the stem;

FIG. 2 is a cross-sectional view taken along the line 2—2 of FIG. 1;

FIG. 3 is a schematic drawing illustrating one barb means of the prior art;

FIG. 4 is a schematic drawing illustrating a second barb means of the prior art;

FIG. 5 is a schematic drawing illustrating the barb means of the present invention; and FIG. 6 is an enlarged elevational view of a portion of the stem of FIG. 1.

The barb means of the present invention is illustrated in conjunction with a hose coupling 10, but it should be understood that the barb means of the present invention could be used with other types of connectors, such as fittings or devices for use with hose. The hose coupling 10 comprises a tubular body having a stem portion 12 and a coupling portion 14. In this instance, the coupling portion 14 is similar to that shown in the previously mentioned Nelson patent and is suitable to connect to a second, similar coupling 10'. Prime reference numerals are used to indicate similar parts for the coupling 10'.

As is shown in FIG. 1, a flexible hose 16, comprising an outer rubber section 18, an intermediate braided cord section 20 and an inner rubber section 22, is installed on the stem portion 12 of the coupling 10. The hose 16 is preferably held in assembled relation on the stem portion 12 by means of a clamp 24. As can be seen in FIG. 1 the stem portion 12 is received in a center opening 25 in the hose 16. The body of the coupling, including the stem 12 and coupling portion 14 has a center opening 26, shown in FIG. 2, through which the fluid conveyed by the hose 16 flows.

A series of plurality of annular ribs or barbs, and in this instance seven barbs, 31–37 are arranged between the opposite ends of the stem of coupling 10, according to present invention, to form an outline in the shape of a stack of truncated cones. The stack of barbs 31–37 extends from the outer end of the stem, or the end that initially engages the hose 16, and terminates adjacent a tapered annular shoulder 38 which is adjacent to the inner end of the stem and the coupling portion 14. For each barb on the stem 12 of coupling 10, the smaller ends of the truncated cones face toward the left, or outer end of the stem, while the larger ends face toward the right, or inner end of the stem that is adjacent to the coupling portion 14. The barbs 31–37 are arranged in two tapering sets. The barbs 31–34, comprising the first set, increase in size or external radial dimensions as they run from one end of the stem to an intermediate portion thereof. The barbs 35–37, comprising the second set, increase in size or external radial dimensions as they run from the intermediate portion toward the other end of the stem. The barbs 31–37 first increase, then decrease at an intermediate portion of the stem 12, and again increase as one moves on the stem toward the coupling portion 14. The first barb of the second set, bar 35, is an intermediate barb and is smaller than its adjacent barbs 34 and 36.

All the barbs 31–37 are generally equal in depth, but as illustrated in FIG. 6, each barb has a different internal or minor diameter (for example, for barb 32 the minor diameter is designated 32m to 32m' in FIG. 6) and a different external or major diameter (for example, for barb 32 the major diameter is designated 32M to 32M' in FIG. 6). A coupler stem, suitable for use with a three-fourths inch nominal inside diameter hose, has barb means with the major diameters and minor diameters shown in FIG. 5 and tabulated below:

TABLE I

| Barb Position | HOSE END | | | | | COUPLING END | |
|---|---|---|---|---|---|---|---|
| | 1st | 2nd | 3rd | 4th | 5th | 6th | 7th |
| (Barb No. in Fig. 1) | (31) | (32) | (33) | (34) | (35) | (36) | (37) |
| Major Diameter (inches) | .781 | .788 | .795 | .802 | .790 | .812 | .833 |
| Minor Diameter inches | .726 | .733 | .740 | .747 | .735 | .759 | .778 |

A similar coupling stem for a three-eighths inch nominal inside diameter hose, has barb means wherein the first set includes the first five barbs and the second set includes the last two barbs; the sixth barb, the first barb of the second set, is smaller than its adjacent barbs. The major and minor diameters for such stem are tabulated below:

TABLE II

| Barb Position | HOSE END | | | | | COUPLING END | |
|---|---|---|---|---|---|---|---|
| | 1st | 2nd | 3rd | 4th | 5th | 6th | 7th |
| Major Diameter (inches) | .409 | .413 | .417 | .421 | .428 | .422 | .433 |
| Minor Diameter (inches) | .384 | .388 | .392 | .396 | .390 | .401 | .412 |

In one type barb means of the prior art illustrated by the Nelson patent, the barbs continuously increased in size at a very rapid mean slope as is schematically depicted in FIG. 3 by the slope of the dashed line 39. In fact, the increase of size of the Nelson barbs is readily visible to the naked eye, whereas the barbs of the present invention increase at a slower rate, one which is barely perceptible to the eye.

In a second type barb means of the prior art, suitable for use with a three-fourths inch nominal inside diameter hose, all barbs had 0.844 inches major diameters and 0.789 inches minor diameters, as is schematically depicted in FIG. 4.

The data for prior art barbs and the barbs of the present invention have been schematically displayed in FIGS. 3 and 4 and FIG. 5 respectively using an abscissa generally corresponding to the actual axial spacing of the barbs and an expanded, non-zero ordinate to illustrate the differences between the prior art and the present invention.

In the present invention, the first set of barbs 31 to 34 increases in size at one waveform mean slope, as is depicted by the slope (approximately 0.028 inches/inch) of the dashed line 40 (FIG. 5), and the second set of barbs 35–37 increases in size at a second, increased uniform mean slope, as is depicted by the slope (approximately 0.086 inches/inch) of the dashed line 42 (FIG. 5).

The initial barb 31 first contacted during installation of the hose 16 is smaller than the initial barb of FIG. 4 (0.781 inches as compared to 0.844 inches). Such construction makes installation of the three-fourths inch nominal inside diameter hose on the stem 12 much easier. In fact, the hose 16 may be hand assembled on the stem 12 with relative ease, whereas before, with the barbs of the type shown in FIG. 4, this was difficult or impossible. Unlike the Nelson type barbs, the stem 12 has its barbs sized so that all barbs including barbs 31 and 35 provide an interference fit. Of course, the barb 37 and shoulder 38 provide the tightest interference fit.

The hose 16 is installed on the stem of the coupling 10 in the following manner. The hose 16 is taken in one hand, and the coupling 10 is taken in the other, the end of the stem 12 being aligned with the opening 25 in the hose. The hose 16 and coupling 10 are rapidly forced together with a degree of speed so that the momentum and inertia generated permits the hose to be slipped over the larger barbs 33 and 34 of the first set and barbs 36 and 37 of the second set and the shoulder 38. After the hose is in place, an interference fit is provided all along the hose from the initial barb 31 of the first set, to the last barb 37 of the second set. The interference fit, of course, is greater at the larger barbs. The hose is then further secured in place by means of a clamp, such as the wire clamp 24. The clamp 24 is generally placed on the hose over the intermediate portion of the stem and the barb 35. The clamp 24 forces the hose 16 into the depressed, intermediate area of the stem to still further secure the hose 16 to the stem 12 of the coupling 10.

I claim:

1. In a hose connector having an elongated tubular body, one end thereof forming a stem portion adapted to receive a hose and the other end thereof having a coupling portion adapted to be connected to a fluid conduit, the improvement comprising a plurality of annular barb means on said tubular body, said barb means first increasing, then decreasing and then increasing in external radial dimensions from the stem portion toward the coupling portion, the rates of increase in external radial dimensions of said barb means being different, said barb means including first and second sets of at least two barbs each, the last barb of the second set being of the largest external radial dimension and the first barb of the first set being of the smallest external radial dimension.

2. In a hose connector as in claim 1, wherein said barb means includes seven barbs, the first four barbs of the first set and the last three barbs of the second set increase in external radial dimension from said stem portion toward said coupling portion, the fifth barb being of smaller external radial dimension than either adjacent barb.

3. In a hose connector as in claim 1, wherein said barb means includes seven barbs, the first five barbs of the first set and the last two barbs of the second set increase in external radial dimension from said stem portion toward said coupling portion, the sixth barb being of smaller external radial dimension than either adjacent barb.

* * * * *

UNITED STATES PATENT OFFICE
CERTIFICATE OF CORRECTION

PATENT NO. : 3,907,342
DATED : September 23, 1975
INVENTOR(S) : Edmund C. Dudek

It is certified that error appears in the above-identified patent and that said Letters Patent are hereby corrected as shown below:

Col. 1, line 54, "greater" should read --greatest--.
Col. 3, line 67, "waveform" should read --uniform--.

Signed and Sealed this thirtieth Day of March 1976

[SEAL]

Attest:

RUTH C. MASON
Attesting Officer

C. MARSHALL DANN
Commissioner of Patents and Trademarks